(12) United States Patent
Loh

(10) Patent No.: US 6,941,399 B2
(45) Date of Patent: Sep. 6, 2005

(54) ELECTRONIC INTERFACE DEVICE

(75) Inventor: Weng Wah Loh, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 412 days.

(21) Appl. No.: 10/163,879

(22) Filed: Jun. 7, 2002

(65) Prior Publication Data

US 2003/0005204 A1 Jan. 2, 2003

(30) Foreign Application Priority Data

Jun. 8, 2001 (GB) ............................................. 0113930

(51) Int. Cl.[7] .............................................. G06F 13/00
(52) U.S. Cl. ....................................... 710/300; 710/304
(58) Field of Search ................................ 710/300–304, 710/9

(56) References Cited

U.S. PATENT DOCUMENTS

| 5,050,041 A | | 9/1991 | Shafi |
| 5,457,590 A | | 10/1995 | Barrett et al. |
| 5,619,396 A | | 4/1997 | Gee et al. |
| 5,653,634 A | * | 8/1997 | Hodges ....................... 700/91 |
| 5,666,267 A | | 9/1997 | Carter et al. |
| 5,710,821 A | | 1/1998 | Cheah |
| 5,765,027 A | | 6/1998 | Wang et al. |
| 5,894,425 A | | 4/1999 | Saliba |
| 5,948,077 A | * | 9/1999 | Choi et al. ...................... 710/9 |
| 6,038,612 A | | 3/2000 | Liow |
| 6,044,423 A | * | 3/2000 | Seo et al. ................... 710/302 |
| 6,067,583 A | | 5/2000 | Gilbert |
| 6,091,602 A | * | 7/2000 | Helot .......................... 361/686 |
| 6,309,230 B2 | * | 10/2001 | Helot .......................... 439/131 |
| 6,493,782 B1 | * | 12/2002 | Verdun et al. .............. 710/300 |
| 6,526,515 B1 | * | 2/2003 | Charles et al. .............. 713/300 |

FOREIGN PATENT DOCUMENTS

| EP | 0 789 468 A1 | 8/1997 |
| GB | 2 305 526 A | 4/1997 |
| GB | 2 321 732 A | 8/1998 |
| WO | WO 98/38812 A12 | 9/1998 |
| WO | WO 02/05102 A1 | 1/2002 |

* cited by examiner

*Primary Examiner*—Tim Vo

(57) ABSTRACT

An electronic interface device interfaces between a first and second electronic device. The first device has a mechanical module connector. The electronic interface device includes a receiver/transmitter for receiving signals from and transmitting signals to the second electronic device, a circuit for decoding/coding and mapping its input/output signals, and a connector connected to the mechanical module connector of the first electronic device.

10 Claims, 2 Drawing Sheets

ELECTRONIC INTERFACE DEVICE

BACKGROUND AND SUMMARY OF THE INVENTION

The invention relates to an electronic device for interfacing between a first electronic device and a second electronic device for data transfer therebetween.

Many people have a number of personal electronic devices which they use in their daily lives, such as notebook computers, personal digital assistants (PDAs), and mobile telephones. On occasion, it can be advantageous to transfer data between these devices, for example, to synchronise diaries held in a PDA and a notebook computer or to transfer lists of telephone numbers between a mobile telephone and a notebook computer.

At present, bulk high speed transfer between such devices is achieved via a Universal Serial Bus (USB), parallel port, or Fast Infrared (FIR). Communication via USB or FIR requires the appropriate USB or FIR controller, which increases the overall cost of production of the devices. The use of a parallel port is cheaper to implement but is only capable of 8-bit data transfer and requires the use of connection cables. Furthermore, parallel ports will be phased out of such devices in due course.

It is an aim of the present invention to provide an alternative solution which mitigates the above-described difficulties.

According to one aspect of the present invention, there is provided an electronic interface device for interfacing between a first electronic device having a mechanical module connector and a second electronic device. The interface device includes a receiver/transmitter for receiving signals from and transmitting signals to the second electronic device, a decoder circuit for decoding/coding and mapping the input/output signals, and a connector for connecting to the mechanical module connector of the first electronic device.

Conveniently, the electronic interface device is implemented on a field-programmable gate array (FPGA).

Preferably, the receiver/transmitter permits wireless communication between the electronic interface device and the second electronic device. Conveniently, the receiver/transmitter operates in the infrared.

In use, the electronic interface device preferably is received within a slot in the first electronic device intended for a mechanical module such as a floppy disc drive, CD drive, or DVD drive.

DESCRIPTION OF THE DRAWINGS

Embodiments of the invention will now be described, by way of example only, with reference to the drawings, in which.

DETAILED DESCRIPTION OF THE DRAWINGS

Figure 1:
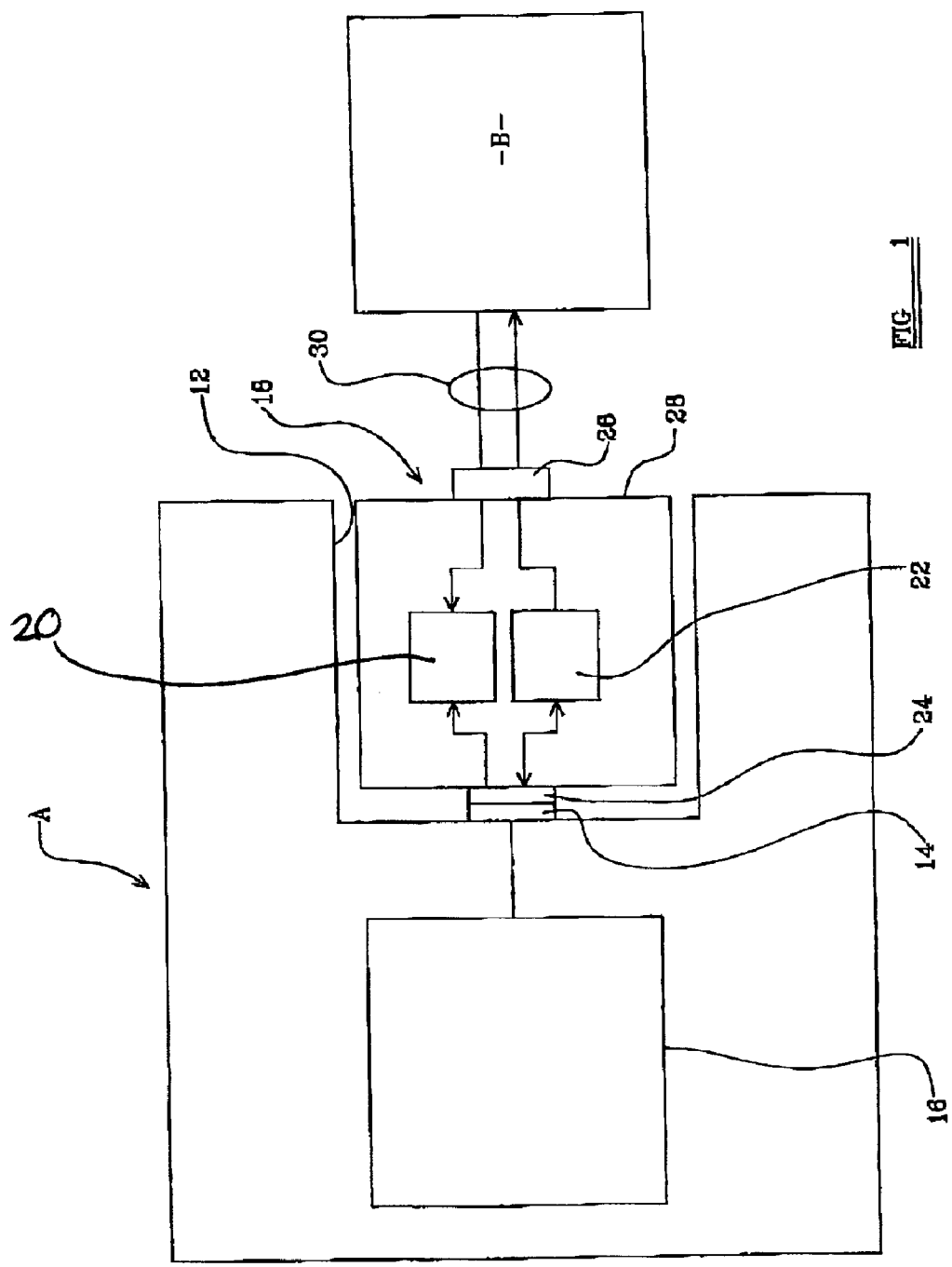
FIG. 1 is a schematic illustration of a first embodiment of the invention.

Referring first to FIG. 1, a first electronic device A, such as a notebook computer, has a slot 12 for receipt of a mechanical module such as a floppy disc drive, CD drive, or DVD drive. At the rear of the slot is a mechanical module connector 14 into which, in use, the selected mechanical module is connected for the transfer of data between the mechanical module and the circuitry 16 within the first electronic device A.

An electronic interface device 18 establishes communication between the first electronic device A and a second electronic device B. The interface device 18 includes a receiver/transmitter 20 for receiving input signals from or sending output signals to the second electronic device H, a decoder circuit 22 for decoding/coding of the input and output signals, and a mechanical connector 24 for connection with the mechanical module connector 14 of the first electronic device A. The interface device 18 also includes a mechanical connector 26 for a tether lead 30 for connection to the second electronic device B. In this embodiment, the input and output signals of the receiver/transmitter 20 are microprocessor-bus-compatible.

Most conveniently, the interface device 16 is implemented in a housing 28, which is substantially identical to those in which the above-described mechanical modules are housed and which is of a size just small enough for receipt in the slot 12 in the first electronic device A, such that the connectors 14 and 24 are readily aligned when the interface device 18 is inserted into the slot 12. Thus, connection is simple to achieve.

The receiver/transmitter 20 and decoder circuit 22 are conveniently implemented on a Field-Programmable Gate Array (FPGA), although other forms of implementation may used as appropriate.

Figure 2:
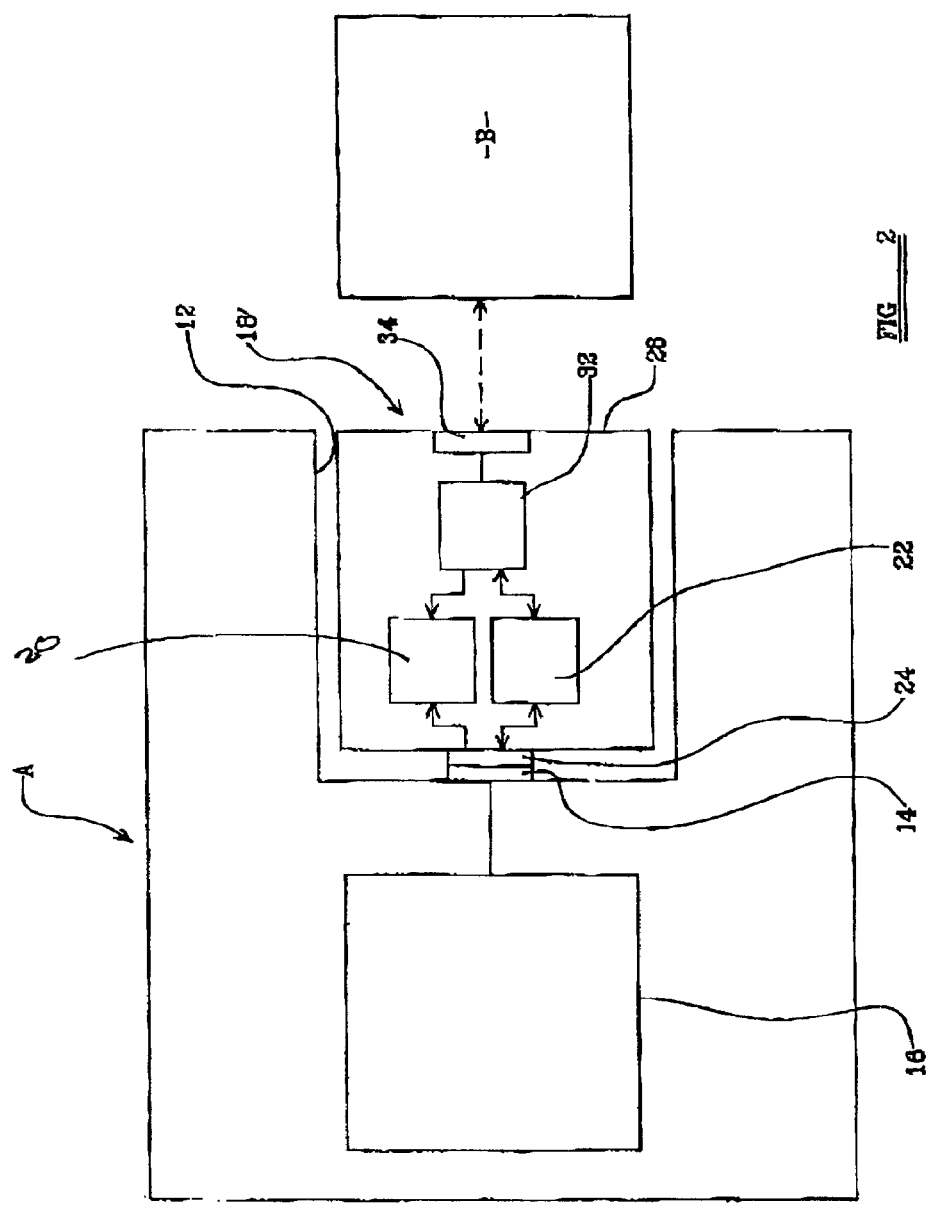
FIG. 2 is a schematic illustration of a second embodiment of the invention.

Referring now to FIG. 2, an alternative embodiment of an electronic interface device 18' is illustrated, with parts common to the first embodiment 18 being like referenced. The electronic interface device 18' includes a conversion circuit 32 and an infrared transmitter/receiver 34. The conversion circuit 32 converts into microprocessor-bus-compatible format signals received in infrared from the second electronic device B , and converts from microprocessor-bus-compatible to infrared signals for transmission to the second electronic device B. Thus, in this alternative embodiment, interface device 18' establishes infrared communication without the need for a tether lead.

In still further embodiments, communication can be established by different means, and will simply require appropriate conversion circuits.

The electronic interface devices 18 and 18' operate very simply. When data transfer is desired between the first and second electronic devices A and B, the interface device 18 is connected to the mechanical module connector 14 of the first electronic device A. The second electronic device B is aligned with the interface device 18 as connected via the tether lead 30 or, for infrared wireless communication, is aligned with the infrared transmitter/receiver 34. Data transmission can then take place.

The data which would normally be communicated to or from a selected mechanical module via the mechanical module connector 14 uses a large set of addresses. An IDE controller is normally used for communication between the first electronic device A and a selected mechanical module. Such IDE controllers are typically integrated with the relevant drive (e.g., floppy, CD, or DVD) and are, therefore, part of the relevant mechanical module. In simple high speed data transfer between devices such as a PDA and a notebook, two sets of data addresses are used. Conveniently, 0376H is used to receive data from the second device B, and 0170H is used to send data to the second device H. It should be noted that 0376H and 0170H refer to an x86 microprocessor I/O map.

The use of the interface according to the invention does not require an IDE controller to communicate via the module connector 14, thus keeping down the cost of the device. Indeed, the interface device 18 can be manufactured using relatively few components that are also inexpensive.

The features disclosed in the foregoing description or the following claims or the accompanying drawings, expressed in their specific forms or in terms of a means for performing the disclosed function or a method or process for attaining the disclosed result as appropriate, may, separately or in any combination of such features, be utilised for realising the invention in diverse forms thereof.

What is claimed is:

1. An electronic interface device for interfacing between a first electronic device having a mechanical module connector and a second electronic device comprising a receiver/transmitter for receiving signals from and transmitting signals to the second electronic device, a circuit for decoding/coding and mapping input/output signals adapted to be coupled to the circuit from the second electronic device and to be coupled by the circuit to the second electronic device, and a connector for connecting to the mechanical module connector of the first electronic device, the interface device being adapted to engage with a device bay in said first electronic device.

2. An electronic interface device according to claim 1 wherein, in use, the electronic interface device is adapted to be received within the device bay in the first electronic device, said device bay being adapted to receive a floppy disc drive mechanical module, CD drive mechanical module or DVD drive mechanical module.

3. An electronic interface device according to claim 1, wherein the electronic interface device includes a field-programmable gate array.

4. An electronic interface device according to claim 1, further including a conversion circuit and input/output device for providing wireless communication between the electronic interface device and the second electronic device.

5. An electronic interface device according to claim 4, wherein the input/output device operates in the infrared.

6. In combination, an electronic interface device interfaced between a first electronic device having a mechanical module connector and a second electronic device, the interface device including (a) a receiver/transmitter for receiving signals from and transmitting signals to the second electronic device, (b) a circuit for decoding/coding and mapping input/output signals adapted to be coupled to the circuit from the second electronic device and to be coupled by the circuit to the second electronic device, and (c) a connector connected to the mechanical module connector of the first electronic device, the interface device being engaged with a device bay in said first electronic device.

7. The combination of claim 6, wherein the electronic interface device is received within the device bay in the first electronic device, said device bay being adapted to receive a floppy disc drive mechanical module, CD drive mechanical module or DVD drive mechanical module.

8. The combination of claim 6, wherein the electronic interface device includes a field-programmable gate array.

9. The combination of claim 6, wherein the electronic interface device further includes a conversion circuit and input/output device for providing wireless communication between the electronic interface device and the second electronic device.

10. The combination of claim 9, wherein the input/output device operates in the infrared.

* * * * *